United States Patent [19]

Glanzmann

[11] Patent Number: 4,601,182
[45] Date of Patent: Jul. 22, 1986

[54] STEERING WHEEL DEVICE

[76] Inventor: Edward J. Glanzmann, 2139 Greyhorse Dr., Warrington, Pa. 18976

[21] Appl. No.: 679,738

[22] Filed: Dec. 10, 1984

[51] Int. Cl.$^4$ ............................................. B60R 25/04
[52] U.S. Cl. ......................................... 70/252; 403/13; 403/359
[58] Field of Search ................ 70/252, 183, 187, 221, 70/251, 237; 403/13, 359

[56] References Cited

U.S. PATENT DOCUMENTS

| 1,381,000 | 6/1921 | Mueller | 70/252 |
|---|---|---|---|
| 1,471,553 | 10/1923 | Fell | 70/252 |
| 2,500,593 | 3/1950 | Wilson | 70/252 |
| 2,821,277 | 1/1958 | Hughes | 403/359 |
| 3,293,938 | 12/1966 | Nestor | 403/359 |
| 3,380,097 | 4/1968 | Pharris | 403/359 |
| 3,541,871 | 11/1970 | Burrell | 403/359 |

Primary Examiner—Gary L. Smith
Assistant Examiner—Vinh Luong
Attorney, Agent, or Firm—Gregory J. Gore

[57] ABSTRACT

A steering wheel disabling device intended for anti-theft purposes includes a necessary component of the steering mechanism which may be easily removed by the vehicle operator. The intermediate component comprises a hollow cylinder with internal and external splines. This interlock cylinder is insertable into the steering wheel of the vehicle through an access door on the face of the steering wheel.

3 Claims, 5 Drawing Figures

STEERING WHEEL DEVICE

FIELD OF THE INVENTION

This invention relates to a device to be used on automobile steering wheels whereby the steering wheel may be disengaged from the remainder of the steering mechanism for the purposes of rendering the automobile inoperable.

The instant invention is intended as an anti-theft device to be used primarily in automotive applications. The inventor's instant patent application relates to a similar design intended to achieve the same purpose and which has been recently filed and accorded informal application Ser. No. 672,610. Separate applications have been filed because the structural differences in the two designs are vastly different, however, the inventor considers each the best mode of carrying out each species of the general concept.

BACKGROUND OF THE INVENTION

The problem of automobile theft is widespread and there have been many commercial attempts either through after-market sales, or by incorporation into the manufacture of automobiles to provide the consumer with an effective anti-theft device. The present invention is thought to be the best solution to this problem and a significant improvement over the prior art.

PRIOR ART

The prior art in the field of automotive steering anti-theft devices is mainly occupied by systems connected to the ignition switch which consist of a bolt type lock on the steering column which prevents the wheel from being turned once it is in the locked position. There have been many other systems which have also been employed to effect the same result, that is, to disable the steering wheel mechanism by fixing the steering wheel to a locked position. The disadvantage of this system is that a would-be thief need only overcome the locking mechanism to defeat the system either by removing the locking mechanism or by imposing excessive force to overcome its restraint. The object of the present invention is to disable the steering mechanism by using a disengaging concept. In the present invention, the steering wheel is disengaged from the remainder of the steering mechanism. In this way, the would-be thief would be unable to steer the vehicle.

There have been previous attempts to implement this concept, namely, U.S. Pat. No. 1,400,507 to C. N. Addis, and U.S. Pat. No. 1,176,500 to W. S. Torrence. These references are the closest prior art of which the applicant is aware. However, significant differences are present in the applicant's invention which represent marked improvement over the prior art.

In both references above, the lock and key mechanism moves an intermediate component between the steering wheel and the steering column into and out of engagement. These designs represent no improvement over the steering locking mechanism in that all the would-be thief need do to overcome the system is to defeat the key mechanism and manually move the intermediate part into its operating position. The applicant's invention, however, embodies a system whereby the intermediate component necessary to complete the mechanical linkage can be conveniently removed by the operator and taken with him. In this situation, for the would-be thief to defeat this system, he must not only overcome the locking device but also supply the necessary intermediate part in order to complete the linkage. Since the instant invention comprises the intermediate part which is specifically designed to be difficult to duplicate, it would be a great deterrant to theft in that it would be difficult to quickly find the mechanical replacement for this missing intermediate component.

SUMMARY OF THE INVENTION

It is the object of the instant invention to provide an automobile with a steering wheel which may be selectively engaged and disengaged from the remainder mechanism by the driver for anti-theft purposes. It is a further object of the instant invention to provide a steering mechanism for an automobile which may be selectively engaged and disengaged by the removal of the necessary parts of the mechanical linkage between the steering wheel and the remainder of the steering mechanism. Furthermore, it is an object of the instant invention to make the removeable intermediate component small in size, easy to carry and convenient to operate.

The instant invention comprises a cylindrically shaped hollow component which is splined both internally and externally and designed to be inserted over the end of the steering shaft and thereby interconnecting the steering shaft and the steering wheel by means of the mating splined relationship between these two components. The interlock cylinder is concealed by a lockable door compartment which is flush with the face of the steering wheel. The system is designed so that when in place, the interlock cylinder provides a strong and secure mechanical linkage.

DESCRIPTION OF THE PREFERRED EMBODIMENT

Figure 2:
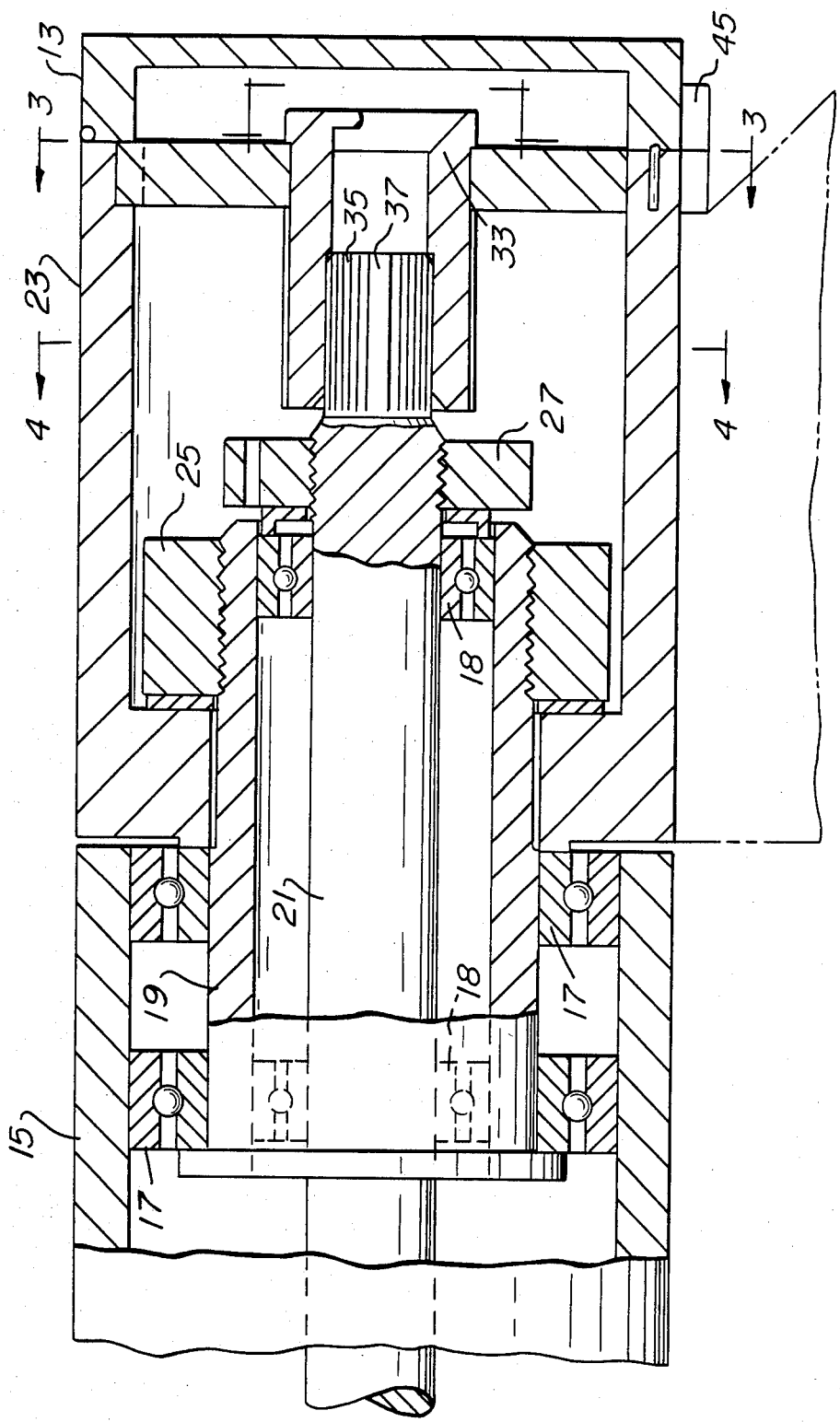
FIG. 2 is a sectional view of FIG. 1 along line 2—2.

Referring now to FIG. 2, steering column 15 supports both steering wheel spindle 19 and steering shaft 21 by cooperating bearing means 17. Steering wheel spindle 19 then, it can clearly be seen, is at all times independently rotatable from steering shaft 21 being carried by bearing means 18. Steering wheel 23 is affixed to steering wheel spindle 19 by nut means 25. End play of steering shaft 21 is taken up by nut means 27. Steering wheel 23 contains access cover 13 which is hinged to provide both an open and closed position so that interlock cylinder 33 may be inserted and removed and also its access may be restricted by key lock means 45. It is intended that each interlock cylinder and coverplate pin have a unique combination of splines so that interlock cylinders are not useable between different cars.

Figure 1:
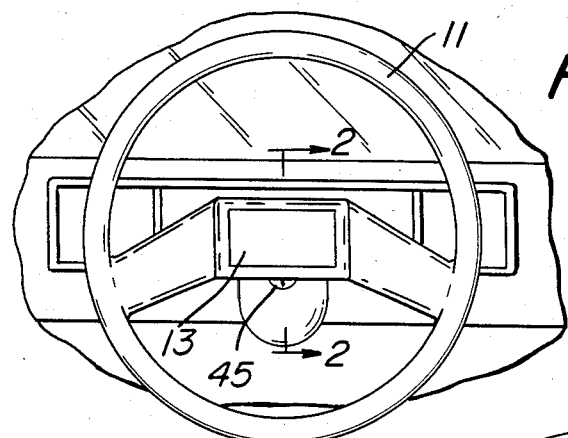
FIG. 1 shows a view of the dashboard and steering wheel arrangement of an average automobile.
Figure 3:
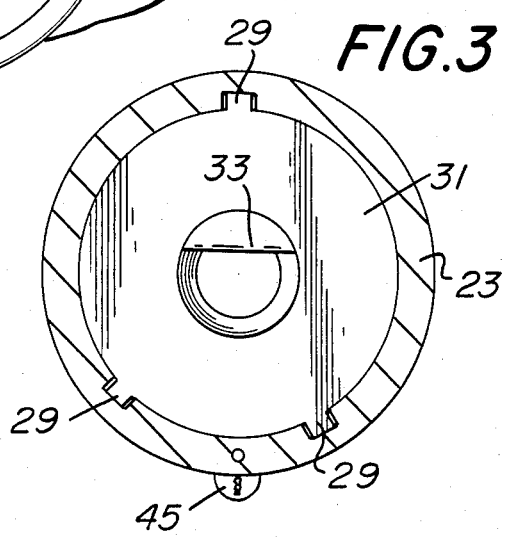
FIG. 3 is a sectional view of FIG. 2 along line 3—3.

Referring now to FIG. 3, cover plate 31 is shown with interlock cylinder inserted into its position of engagement. Cover plate 31 contains drive pins 29 which frictionally engage cover plate 31 to steering wheel 23 through mating slots in the steering wheel. The cover plate is intended to restrict access to the splined steering shaft yet be removeable for maintenance of the steering assembly. Cover plate 31 is force fit into steering wheel 23. Drive pins 29 may be positioned around the periphery of cover plate 31 in different patterns thus precluding the possibility of a cover plate/interlock cylinder pair being taken from one car and used on another. Each car should have a unique steering wheel-cover plate-interlock cylinder combination.

Figure 4:
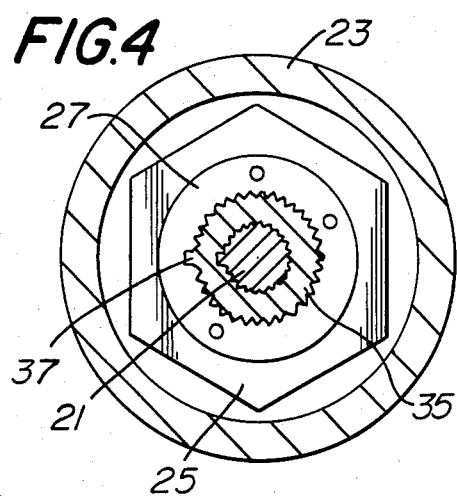
FIG. 4 is a sectional view of FIG. 2 along line 4—4.
Figure 5:
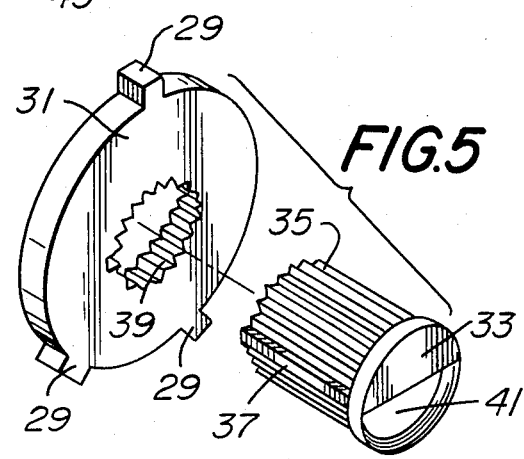
FIG. 5 is an exploded isometric showing the interrelationship between the interlock cylinder and cover plate.

Referring now to FIG. 4, a cross section of the interlock cylinder 33 shows its internal and externally splined characteristics. Key projection 37 aligns with a compatable receiving slot 43 shown in FIG. 5 so that when in place, the steering shaft and steering wheel are always connected at the same point of rotation. In this way the steering wheel is always correctly aligned with respect to the direction of the front wheels of the car. In FIG. 5, apperture 41 within interlock cylinder 33 provides a convenient gripping point for manually removing the interlock cylinder from its engaged position.

While the aforementioned position is only one embodiment of the present invention as conceived by the inventor, it is to be understood that this embodiment is given by example only and the applicant's invention is to be limited only by the claims presented herein and their legal equivalents.

What is claimed is:

1. A steering wheel disabling apparatus for a motor vehicle, comprising:

(a) a steering support column;
    (b) a steering wheel spindle rotatably mounted internal to and concentric with said steering support column;
    (c) a steering wheel affixed to said steering wheel spindle;
    (d) a steering shaft concentric with said steering wheel spindle and rotatably mounted thereto, said steering shaft having a splined end section;
    (e) a coverplate affixed to said steering wheel, said coverplate having an internally splined aperture and located above the splined end section of said steering shaft such that said aperture and said end section are spaced apart axially;
    (f) a removable interlock cylinder having both internal and external splines, said internal spline engaging said steering shaft and said external splines engaging the splined aperture of said coverplate whereby said interlock cylinder may be manually retracted or inserted between said coverplate and said steering shaft in order that said steering shaft may be disengaged or engaged to said steering wheel.

2. The apparatus as described in claim 1 further including an access cover hinged to said steering wheel, said access cover covering the said coverplate apperture when in a closed position and having locking means.

3. The apparatus described in claim 2 further including a plurality of drive pins located around the periphery of said coverplate for frictionally engaging said steering wheel.

* * * * *